(12) United States Patent
Kukoyi

(10) Patent No.: US 9,465,711 B2
(45) Date of Patent: Oct. 11, 2016

(54) PROVIDING POWER UTILIZATION INFORMATION FOR OPERATIONAL STATES OF AN APPLICATION ACROSS DIFFERENT OPERATING SYSTEMS

(71) Applicant: Verizon Patent and Licensing Inc., Arlington, VA (US)

(72) Inventor: Dolapo O. Kukoyi, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 219 days.

(21) Appl. No.: 14/170,117

(22) Filed: Jan. 31, 2014

(65) Prior Publication Data

US 2015/0220127 A1    Aug. 6, 2015

(51) Int. Cl.
| | |
|---|---|
| *G06G 1/00* | (2006.01) |
| *G06F 11/30* | (2006.01) |
| *G06F 1/32* | (2006.01) |
| *H04W 52/02* | (2009.01) |
| *H04W 4/00* | (2009.01) |

(52) U.S. Cl.
CPC ......... *G06F 11/3062* (2013.01); *G06F 1/3206* (2013.01); *H04W 52/0258* (2013.01); *H04W 4/001* (2013.01); *H04W 52/0264* (2013.01)

(58) Field of Classification Search
CPC ... G06F 1/30; H04W 52/0258; H04W 4/001; H04W 52/0264
USPC ............. 713/320, 323, 340, 100, 1; 711/111; 717/124; 726/23; 700/295
See application file for complete search history.

(56) References Cited

U.S. PATENT DOCUMENTS

| | | | | |
|---|---|---|---|---|
| 8,539,169 B1* | 9/2013 | Fisher | ................... | G06F 3/0625 711/111 |
| 2007/0192641 A1* | 8/2007 | Nagendra | ............. | G06F 1/3203 713/320 |
| 2011/0185202 A1* | 7/2011 | Black | ................ | H04W 52/0258 713/320 |
| 2012/0065802 A1* | 3/2012 | Seeber | .................. | G06F 1/3203 700/295 |
| 2012/0239949 A1* | 9/2012 | Kalyanasundaram | ..................... | G06F 1/3212 713/320 |
| 2013/0007495 A1* | 1/2013 | Maciocco | ......... | H04W 52/0206 713/323 |
| 2013/0339759 A1* | 12/2013 | Doddavula | ........... | G06F 1/3206 713/300 |
| 2014/0006769 A1* | 1/2014 | Chory | ................... | G06F 1/3203 713/100 |
| 2014/0173319 A1* | 6/2014 | Zeng | ................... | G06F 11/3013 713/340 |
| 2014/0208088 A1* | 7/2014 | Somani | ............... | G06F 9/44505 713/1 |
| 2014/0237283 A1* | 8/2014 | Bayang | ............... | G06F 11/3062 713/340 |
| 2014/0281608 A1* | 9/2014 | Yin | ........................ | G06F 1/3212 713/320 |
| 2014/0281648 A1* | 9/2014 | Russell | ..................... | G06F 1/32 713/340 |
| 2014/0325481 A1* | 10/2014 | Pillai | ................... | G06F 11/3409 717/124 |
| 2015/0081127 A1* | 3/2015 | Bhageria | ................... | H02J 4/00 700/295 |
| 2015/0121113 A1* | 4/2015 | Ramamurthy | .......... | H02J 9/061 713/340 |
| 2015/0121524 A1* | 4/2015 | Fawaz | .................. | G06F 21/552 726/23 |

* cited by examiner

Primary Examiner — Aurel Prifti

(57) ABSTRACT

An approach for providing power utilization information for one or more operational states of an application across different operating systems is described. A power utilization platform determines power utilization information for one or more operational states of an application, one or more operating systems in which the application executes, or a combination thereof. The power utilization platform further stores the power utilization information as metadata associated with a record of the application in a data repository associated with an application distribution service. The power utilization information is then presented in a user interface of the application distribution service in a response to a request to view the record of the application.

16 Claims, 11 Drawing Sheets

308

300

318

314

PROVIDING POWER UTILIZATION INFORMATION FOR OPERATIONAL STATES OF AN APPLICATION ACROSS DIFFERENT OPERATING SYSTEMS

BACKGROUND INFORMATION

Application developers and service providers are continually challenged to deliver value and convenience to consumers by providing compelling applications and delivery platforms. One area of interest has been providing users with methods for limiting the amount of power consumed by user devices (e.g., mobile devices) that employ the applications. For example, many applications are configured to perform various network tasks, activate the sensors of the user device, persistently monitor user activity or perform various other run-time operations that may significantly drain the battery power of the device. Typically, users are not aware of the power utilization of the application until after it has been loaded onto their device and executed by the operating system.

Based on the foregoing, there is a need for providing power utilization information for one or more operational states of an application across different operating systems.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing power utilization information for one or more operational states of an application across different operating systems is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to an application distribution service, such as an application "app" store or download center, it is contemplated these embodiments have applicability to any systems, resources, platforms or methodologies for publishing/posting/uploading applications or information regarding said applications, purchasing or distributing applications, acquiring/downloading applications, developing and/or adapting applications or the like.

Figure 1:
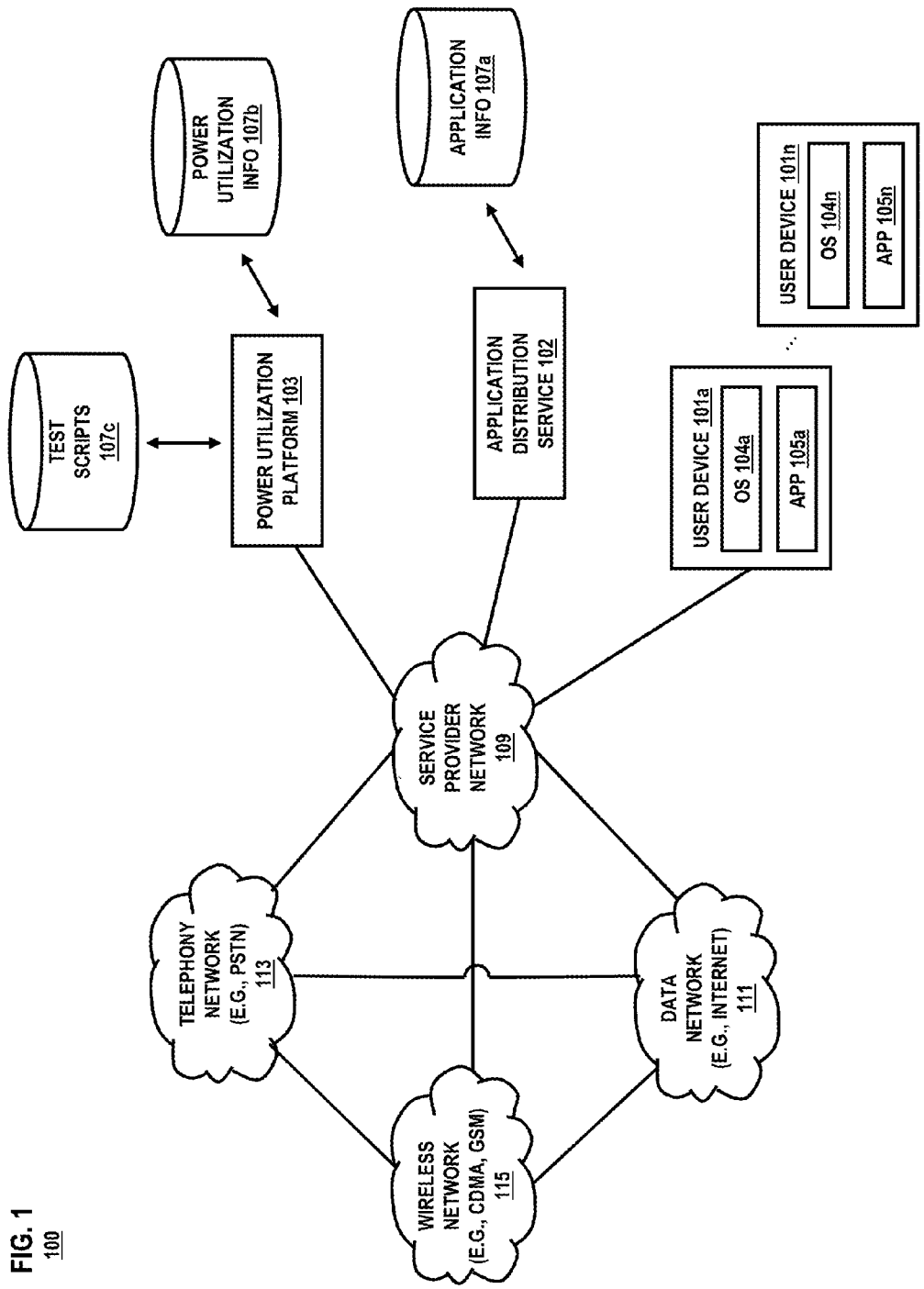
FIG. 1 is a diagram of a system for providing power utilization information for one or more operational states of an application across different operating systems, according to one embodiment.

FIG. 1 is a diagram of a system for providing power utilization information for one or more operational states of an application across different operating systems, according to one embodiment. For the purposes of explanation, system 100 is shown to include one or more user devices 101a-101n (e.g., mobile device, smart phone, netbook, laptop or any communications enabled computing device). By way of example, the user devices 101a-101n, referred to herein as user devices 101, are configured to communicate with an application distribution service 102. The application distribution service 102 may include an application store, a data repository, a download center or any other resource for providing user device 101 access to applications or information related thereto. It is noted that while shown as being configured to a network (e.g., service provider network 109) herein, in certain embodiments, the application distribution service 102 may be accessed by way of any known offline interaction means.

Typically, users of devices 101 access various applications for performing different operations tasks. For example, a social networking application may be executed by a user of a mobile device for enabling the user to conveniently interact with friends and peers via a social network while on the go. Generally, the social networking application may perform various run-time operations, including continually accessing a network to facilitate peer-to-peer communication/messaging, activating one or more sound or visual alert features of the device 101 in response to messages or friend activity, activating one or more location sensors for enabling various location based services, etc. Similarly, other applications such as a heart rate monitoring application, language processing application, email tool, news feed application or the like may also run on the user device 101 at any given time; all of which further require the execution of various tasks that drain the available battery power.

To conserve power, users typically manually adjust the settings or features of the different applications running on the user device 101. For example, the user may disable the network connectivity or sensory functions of an application (e.g., disable Wi-Fi or motion sensing). As another example, users may activate one or more standard device power conservation settings (i.e., lower the brightness of the display) or deactivate applications in their entirety as a means of limiting power use. While such efforts may help, ultimately, users lack the necessary data to determine which applications and operational states of said applications result in the most power consumption relative to their specific device operating system. In addition, device users have no effective means of adapting power utilization by applications relative to their specific needs.

To address this issue, system 100 presents a power utilization platform 103 that operates in connection with an application distribution service 102 to generate, acquire and/or convey power utilization information regarding an application 105 across different operating systems (OS) 104a-104n. By way of example, this corresponds to a means of power utilization information determination that accounts for the specific requirements and characteristics of an application 105 on a particular type of operating system (OS).

Furthermore, the platform 103 supports continuous adaptation and refinement of power utilization information regarding an application.

Still further, the power utilization platform 103 operates in connection with user devices 101 to enable effective regulation of power use by an application at the device 101. As will be described more fully later on, the power utilization platform 103 may account for one or more user defined preferences for affecting utilization of the application 105 or other applications at the device 101. In addition, the platform 103 may utilize the determined power utilization information for the application or the other applications to manage execution of said applications at various operational states. The managed execution of the applications may be performed with respect to a user specified prioritization of one or more applications of the device, a user specified duration of use of one or more applications of the device or a combination thereof.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the UDs 101a-101n can support any type of interface for supporting the presentment or exchanging of data. In addition, user devices 101a-101n may facilitate various input means for receiving and generating information, including touch screen capability, keyboard and keypad data entry, voice-based input mechanisms and the like. Any known and future implementations of user devices 101 for directly accessing and/or executing the power utilization platform 103, the application distribution service 102, or a combination thereof are applicable.

By way of example, a first user device 101a may run an application 105 via operating system (OS) 104a while a second user device 101n may run the same application per different OS 104n. Under this scenario, the power utilization of the application 105 as run by the first user device 101a may differ from that of the second device 101n due to the different processing and operational characteristics of the respective OS 104a and 104n. In addition, various characteristics of a device such as the current available battery power, the device type (e.g., processor, memory, version), device peripheral usage (e.g., access to external power sources, connectivity to other user devices) and existing application preferences of the user may further impact power utilization of the application 105 at respective devices 104. Hence, the power utilization platform 103 enables users to access relevant power utilization information regarding the application or various operational states thereof for differing operating systems.

For the purpose of illustration, power utilization information may include a power use rating (e.g., energy units consumed per hour) of the application, a power consumption level of the application (e.g., 15% of available device power), a time duration for representing a maximum period of continuous use of the application (e.g., 6 hours of continuous use), a ranking, grade or textual description for indicating a level of power utilization effectiveness of the application (e.g., 4 out of 5 star power efficiency ranking, B+ power friendliness rating) or a combination thereof. As will be discussed later on herein, the power utilization information may be conveyed textually, graphically or a combination thereof.

In one embodiment, the power utilization platform 103 determines power utilization information for one or more operational states of an application, one or more operating systems in which the application executes, or a combination thereof. By way of example, the power utilization information may be determined as a result of a benchmark determination procedure, wherein the platform 103 is configured to operate as a benchmark evaluation system. Alternatively, the power utilization information may be directly provided by a user, i.e., an application provider, as metadata to be associated with an application.

In the case of the former, the benchmark evaluation procedure may include: (1) determining power utilization information for a specific application 105 and operating system (OS) 104 during various operational states of execution of the application; (2) determining power utilization information for the application 105 based on user defined execution preferences for the application 105 or other applications of a user device 101; (3) receiving historical power utilization information for the application 105 for a group of user device operating systems during various operational states of the application; and (4) determining the power utilization of a specific application 105 relative to the historical power utilization information and/or based on the user defined execution preferences for the application. Hence, the determination/evaluation procedure may include means for calculating the power utilization information, acquiring it from historical records or deriving it based one or more user preferences (e.g., a priority of use as associated with the application). Also, the power utilization information may be determined as a minimum power utilization, an average power utilization, a maximum power utilization or a combination thereof.

The platform 103 may perform the above described benchmark evaluation procedure as one or more test scenarios designed to determine the minimum, average and maximum power utilization of the application 105 under test. Test scenarios may be implemented as one or more customized, executable scripts 107c intended to mimic, model or mirror the operating system during different runtime operating states accordingly. The platform 103 then observes and records the power utilization information to a data repository 107b for these states of operation. Of note, the recorded power utilization information 107b can be used in various ways, including publishing the information 107b as metadata in connection with a record of the application for display by the application distribution service 102. As another example, the information 107b can be stored to a repository of the application provider for future analysis and software optimization purposes. Still further, the power utilization information 107b as determined for different user devices for the same application may be constantly refined to improve the quality of the data set. The embodiments herein support any means of use of the power utilization information 107b.

In one embodiment, the power utilization platform 103 may be configured to interact with the application distribution service 102 (e.g., online application store) for initiating the determination process. For example, when a request to post and/or distribute an application is submitted by an application provider, the platform 103 queries the application provider for power utilization information or performs the benchmark evaluation procedure. By way of this approach, the platform 103 governs the interaction between the application provider and the service 102; thus ensuring all applications provided by the service 102 are associated with relevant power utilization information 107b. The power utilization information 107b as determined is stored by the platform 103 as metadata associated with a record of the application in a data repository of or associated with the application distribution service 102. Resultantly, this information can then be presented to a user interface of the application distribution service 102 as neutral, unbiased power utilization information 107b regarding any application.

In another embodiment, the power utilization platform 103 determines one or more characteristics of a user device 101 making the request to view the record of an application via the application distribution service 102. This includes, for example, initiating a detection of the user device type, the operating system type, the processor type, the memory capacity, the available battery level of the device, etc., when the user device accesses the user interface of the service 102. In addition, the platform 103 may determine any known historic power utilization information for the device, i.e., as determined per prior benchmarking of the application for the user device 101. Hence, the process of determining the characteristics of the device 101 may be performed in association with determining the power utilization of an application 105 of the device 101.

Once the characteristics are determined, the power utilization platform 103 may adapt the power utilization information associated with the application and subsequently update the presented information at the user interface of the service 102. This corresponds to dynamic adaptation of the information, wherein the most recent power utilization information for the application is presented in connection with the application information 107a relative to the operating system of the device. In addition, the platform 103 may also "learn" and maintain a history of the typical power utilization of the application as run on a specific device since download of the application for the device user or a group of other users with the same or similar device. As such, the platform 103 may utilize the historic power utilization information of the application to continually refine the overall information set as sourced from other repositories; thus affecting the power utilization information presented in connection with the application information 107a accordingly.

For the purpose of illustration, a scenario of a user interacting with an application distribution service, i.e., an application store, via their user device is presented. The power utilization platform 103 is configured to interact with the user device 101 as they access the application store via a network connection. Under this scenario, as the user accesses the application distribution service 102 to review details regarding an application available for download or purchase, the platform 103 initiates a detection process to determine the operating system type, processor type and other characteristics of the device. In addition, the platform 103 may determine power utilization information to associate with application based on the determined characteristics of the user device or historic or custom power utilization information regarding the application. As a result, the platform 103 updated the user interface of the application distribution service 102 to present power utilization information that is pertinent to the specific operating system of the device and typical power utilization patterns of the application at the device.

In another scenario, a user initiates a request to post application information 107a to the application distribution service 102. In response to the request, the power utilization platform 103 determines power utilization information for one or more operational states of the application across different operating systems in which the application executes. The determination includes generating the information, such as by performing a benchmark evaluation of the application per one or more test scripts 107c. Alternatively, the determination is fulfilled based on the receipt of manual input from the user. Once determined, the platform 103 then stores the power utilization information 107b as metadata to associate with application information 107a at a repository of the application distribution service 102. This ensures power utilization information is presented at the application store in connection with the posted application while also supporting the refinement of the overall power utilization information set provided by other users of the application across operating systems. It is contemplated, in certain embodiments, that fulfillment of the request is associated with the determination of the power utilization information.

In another embodiment, the power utilization platform 103 also enables users to manage the execution of applications at a user device 101 based on various factors, including a determined prioritization of one or more applications, one or more user specified preferences, one or more characteristics of the device, or a combination thereof. The managing of the application at the device may include, for example, deactivating/discontinuing an application or a specific operating state thereof, generating a message regarding the deactivating/discontinuing of one or more applications, generating a recommendation for indicating a suggested user action (e.g., "Powering down the ABC Messaging App will extend battery life by approximately 30 minutes."), automatically adjusting or overriding a priority of deactivated/discontinued use of applications, initiating a timing of deactivating/discontinuing an application of specific operating state thereof, activating/enabling an application or specific operating state thereof (e.g., deactivating an application that uses a lot of power for one that performs similar functions but uses less power), etc.

By way of example, user devices may interact with the platform 103 from their user device, such as via a user interface of the platform, a widget or application associated with the platform 103, etc. In one embodiment, the user may provide input to the platform 103 for specifying which applications of the device are deemed essential, a prioritization of the various applications and the duration for use of said applications. These inputs impact the management of the applications at the device. The essential applications may include those which the user deems must be available for use over the user-specified period of time; thus the essential applications are to remain active/enabled for the designated period of use. Alternatively, the user may interact with the platform 103 to assign custom priorities for indicating the order in which non-essential applications are to be discontinued during the user-specified period of time. Of note, the prioritization may correspond to an order of deactivation/disabling of one or more applications or features thereof for specific operating states of the applications.

For the purpose of illustration, a scenario for depicting the managed execution of an application at various states of operation is presented. The user device is configured to operate in connection with the power utilization platform 103 for supporting managed execution based on gathered power utilization information 107b. In this case, the user of the device wants to be able to make video calls for the next 6 hours. The user is also aware that their current battery charge is only 66% of capacity and they wish to effectively manage power utilization at the device to meet their requirements. Under this scenario, the user would access an interface of the platform 103 or invoke a widget/application of the platform 103 in order to specify the required time duration of 6 hours. This may include indicating a start time in which to begin the management process. In addition, the user may designate a video chat application of the device as an essential application corresponding to the time period as well as prioritize various other applications (e.g., email application, navigation application and a media player) as non-essential for this period of use. Once the preferences and priorities are established, the user submits the input to the power utilization platform 103. The platform 103 also detects and/or receives data for indicating various characteristics of the user device, such as the current battery capacity, the operating system type, etc.

In response to the request, the platform 103 determines power utilization information to associate with the specified applications based on the particular operating system of the requesting user device. In addition, the platform 103 determines the prioritization of the specified applications (e.g., the priority of the video chat application versus that of the email application) to effectively manage the execution of one or more states of the applications for the designated time period. This includes for example, analyzing the user specified prioritization against the power utilization information 107b for the applications to determine whether the prioritization meets the required period of use. Based on this analysis, the platform 103 then causes a recommendation message to be submitted to a display of the user device for indicating a different prioritization based on historical power utilization information for the video chat application, the other applications and the current battery power of the requesting user device.

The message received by the user, per this scenario, includes details regarding the power utilization of the essential application (the video chat application) as well as power utilization information 107b for the other applications specified by the user. The power utilization information 107b is presented as a rating for indicating a percentage of power use of the application(s) for the operating system of the requesting device. In addition, the message indicates the time duration of 6 hours can be fulfilled as well as the amount of time and/or power utilization recovered as a result of discontinued use of the non-essential applications. The user device then proceeds to invoke the managed execution of the application(s) accordingly for the specified time duration.

It is noted that the power utilization platform 103 facilitates more intelligent and dynamic end-user management of application power utilization based on actual power utilization information culled or generated specific to the operating system and characteristics of a requesting device. This is as opposed to ad-hoc or manual management of applications as performed by the user. In addition, the power utilization platform 103 serves as a governing entity between application providers and an application distribution service, for ensuring relevant power utilization information is associated with applications across varying operating states and operating systems.

In certain embodiments, user devices 101a-101n, the power utilization platform 103, the application distribution service 102 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication networks 109-115 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
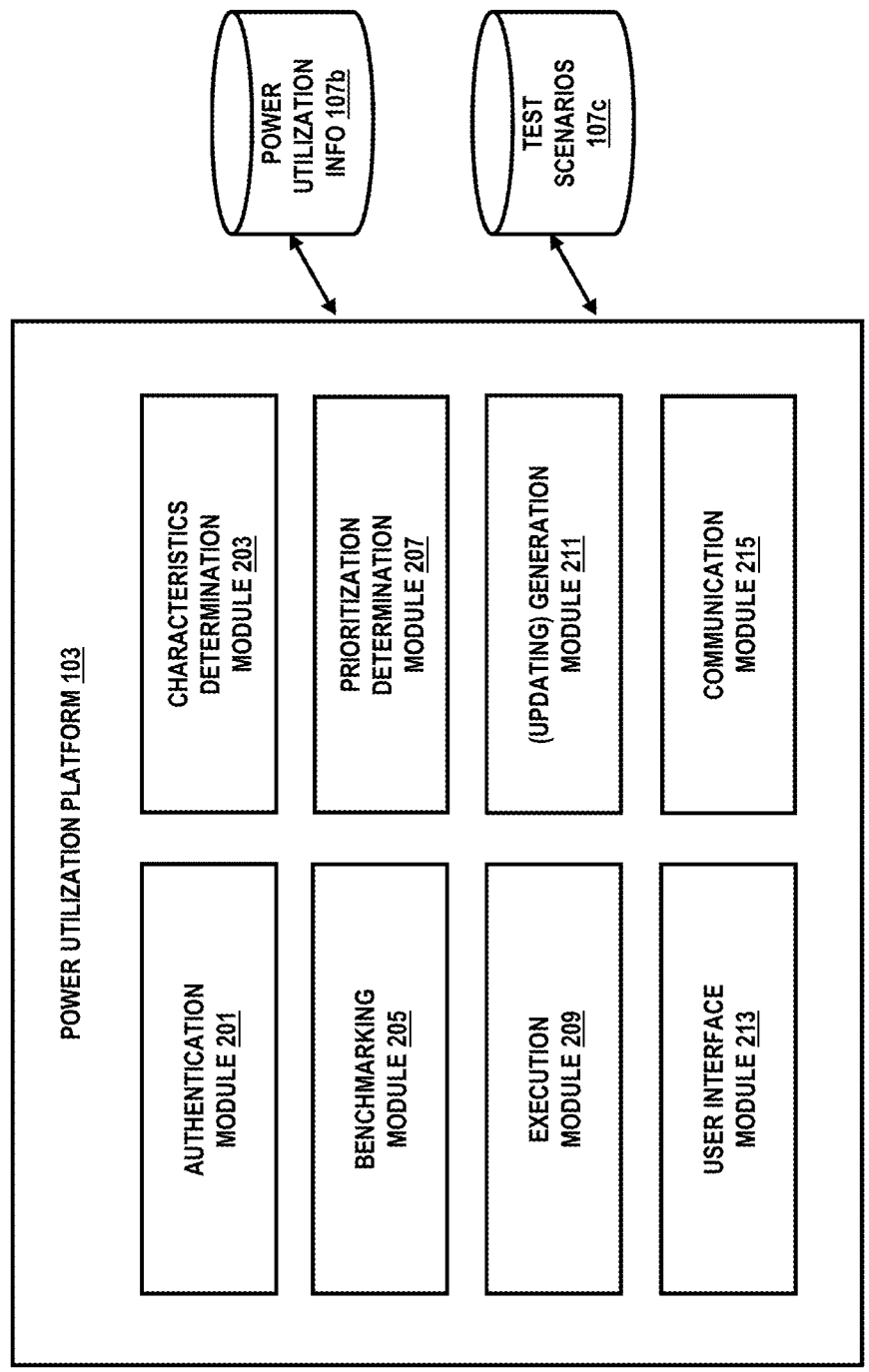
FIG. 2 is a diagram of a power utilization platform, according to one embodiment.
Figure 3B:
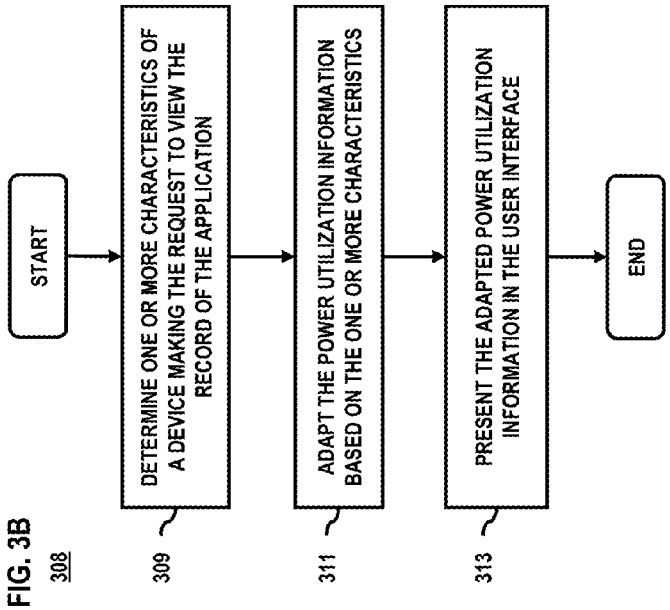
FIGS. 3A-3D are flowcharts of a process for providing power utilization information for one or more operational states of an application across different operating systems, according to various embodiments.
Figure 3A:
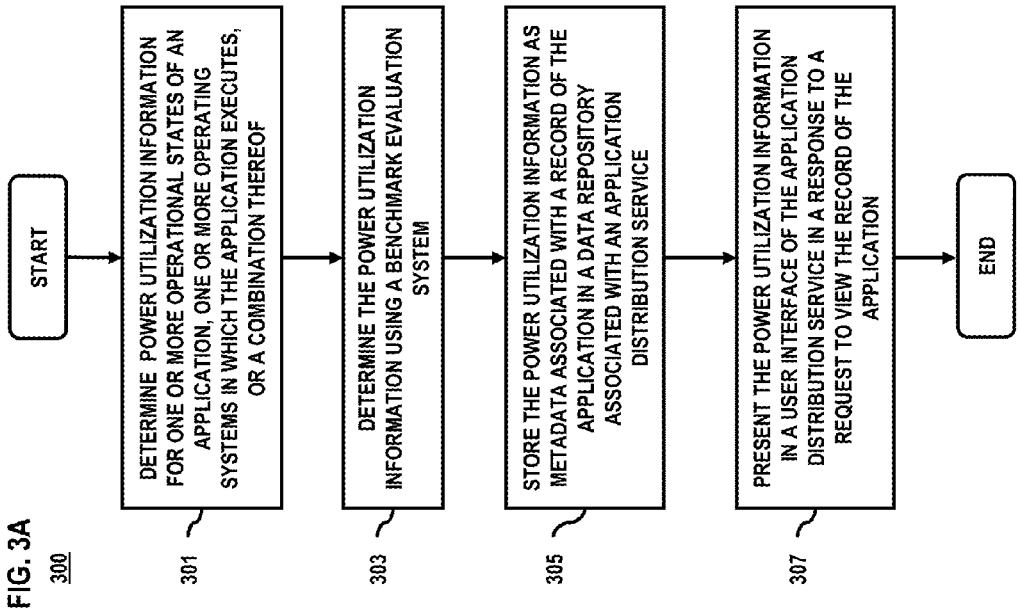
Figure 3D:
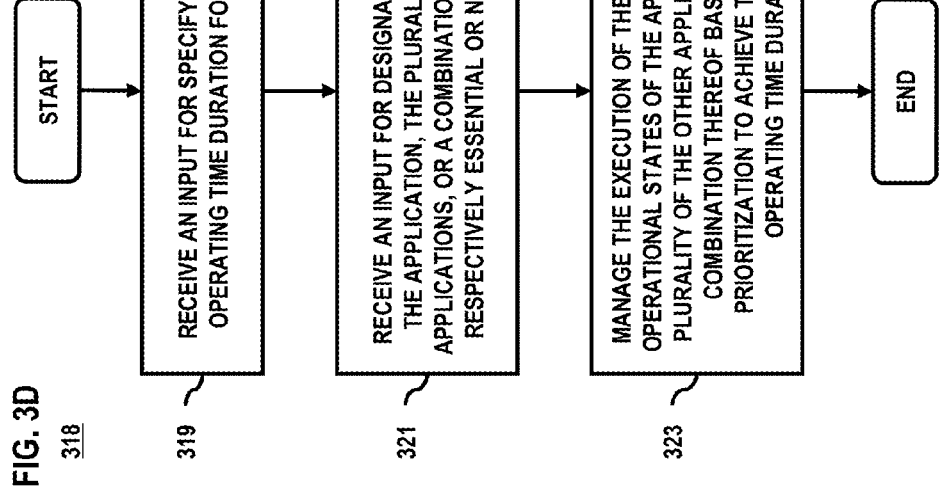
Figure 3C:
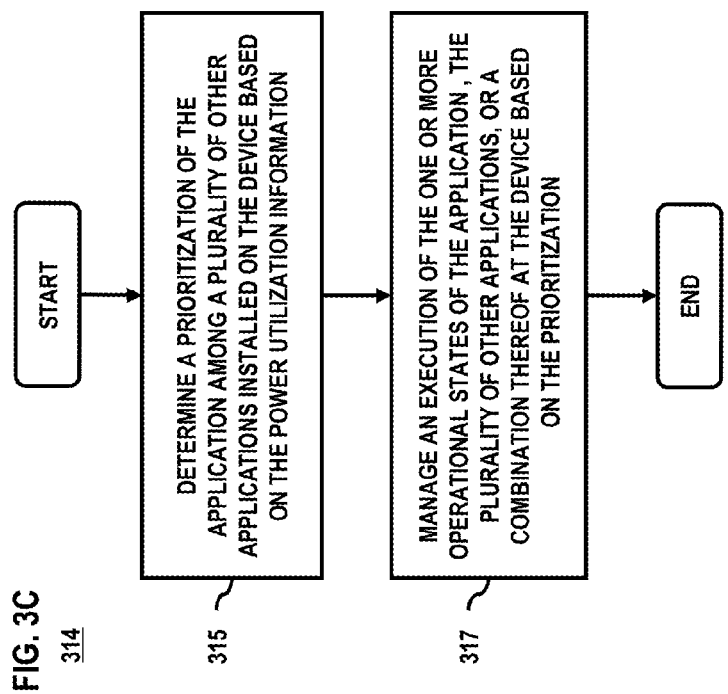

FIG. 2 is a diagram of a power utilization platform, according to one embodiment. The power utilization platform 103 includes various executable modules for performing one or more computing, data processing and network based instructions that in combination provide power utilization information for one or more operational states of an application across different operating systems. Such modules can be implemented in hardware, firmware, software, or a combination thereof. By way of example, the power utilization platform 103 may include an authentication module 201, a characteristics determination module 203, a benchmarking module 205, a prioritization determination module 207, an execution module 209, a generation module 211, a user interface module 213 and a communication module 215. In addition, the platform 103 also accesses test scenarios data and power utilization information from databases 107c and 107b respectively. It is noted that modules 201-215 may access the data maintained at databases 107c and 107b for executing various tasks and functions.

In one embodiment, the authentication module 201 authenticates users and user devices 101a-101n for interaction with the platform 103. By way of example, the authentication module 201 receives a request to subscribe to the platform 103 for enabling the generation of and accessing of power utilization information for different applications. In the case of a first time subscriber to the platform 103, the authentication process may be performed in connection with a benchmarking module 205, which determines power utilization information for one or more operational states of an application for the user device.

In addition, the characteristics determination module 203 may operate in connection with the authentication module 201 for detecting the characteristics of the subscribing user device, including operating system type, device type, processor speed and type, memory availability, device power capacity, etc. This information may be compiled into a historical power utilization information record for the user for supporting subsequent interaction between the device and the platform 103.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 213). Profile information for respective subscribers may be cross referenced as part of the login process against an IP address, a carrier detection signal of the user device, mobile directory number (MDN), subscriber identity module (SIM) (e.g., of a SIM card), radio frequency identifier (RFID) tag or other identifier.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In one embodiment, the characteristics determination module 203 determines the various characteristics of a user device as well as any user specified requirements for affecting power utilization by one or more applications and/or operating states thereof. This may include, for example, receiving an input for indicating a time duration for managing the execution of one or more operational states of an application. The characteristics determination module 203 may also receive input for indicating a priority (e.g., low-to-high priority for discontinued use/deactivation of applications or features thereof) or a designation for indicating whether the application is essential or non-essential. Of note, the characteristics determination module 203 may operate in connection with the user interface module 213 to generate messages at the user interface of a device for requesting and/or receiving said input. Once received, the input is provided to the prioritization determination module 207 for processing.

In one embodiment, the prioritization determination module 207 determines a prioritization of an application among a plurality of other applications installed on the user device based on the power utilization information for said device. The determination may include processing the user input for indicating a priority (low-to-high priority for discontinued use/deactivation of applications) or the input for specifying a designation of whether the application is essential or non-essential. Also, the prioritization determination module 207 may perform an analysis of the inputs against the time duration specified by the user to determine a prioritization of one or more applications for enabling fulfillment of the time duration—i.e., an alternative or optimal prioritization. The prioritization determination module 207 may also account for current device battery power and known power utilization information for determining the priority. Once determined, the prioritization determination module 207 then activates the execution module 209, which generates a signal for managing the execution of the one or more operational states of the application, the plurality of other applications, or a combination thereof at the device based on the prioritization and/or the desired time duration.

In another embodiment, the generation module 211 operates in connection with the benchmarking module 205 and characteristics determination module 203 to continually update power utilization information 107b regarding one or more applications of the user device. By way of example, the generation module 211 updates a history of the typical behavior and power utilization information for an application as run on the device operating system since download of the application from an application distribution service. Based on this information, the generation module 211 then initiates a refining of the power utilization performance information for the same application and operating system as gathered from other repositories, other devices that employ the same application, from known benchmark information, etc.

In one embodiment the user interface module 213 enables presentment of a graphical user interface for the platform 103. By way of example, the user interface module 213 generates the interface in response to application programming interfaces (APIs) or other function calls corresponding to a browser application or web portal application of the user devices 101a-101n; thus enabling the display of graphics primitives. This may include the generation of messages regarding power utilization information for one or more operating states of an application as well as the generation of various fields for receiving user input.

In one embodiment, a communication module 215 enables formation of a session over a network 109 between the platform 103 and the user device. In addition, the communication module 215 may provide an interface to the application distribution service for facilitating the gathering, provisioning and refining of power utilization information with respect to one or more applications. By way of example, the communication module 215 executes various protocols and data sharing techniques for enabling collaborative execution between a user device 101 (e.g., mobile devices, laptops, smartphones, tablet computers, desktop computers) and the platform 103 over the network 109.

The above presented modules and components of the power utilization platform 103 can be implemented in hardware, firmware, software, or a combination thereof. Though depicted as a separate entity in FIG. 1, it is contemplated that the platform 103 may be implemented for direct operation by respective user devices 101a-101n. As such, the platform 103 may generate direct signal inputs by way of the operating system 104 of the device for interacting with the application 105 and accessing the application distribution service 102. In another embodiment, one or more of the modules 201-215 may be implemented for operation by respective user devices as a platform 103, hosted solution, cloud based service, or the like.

Figure 6:
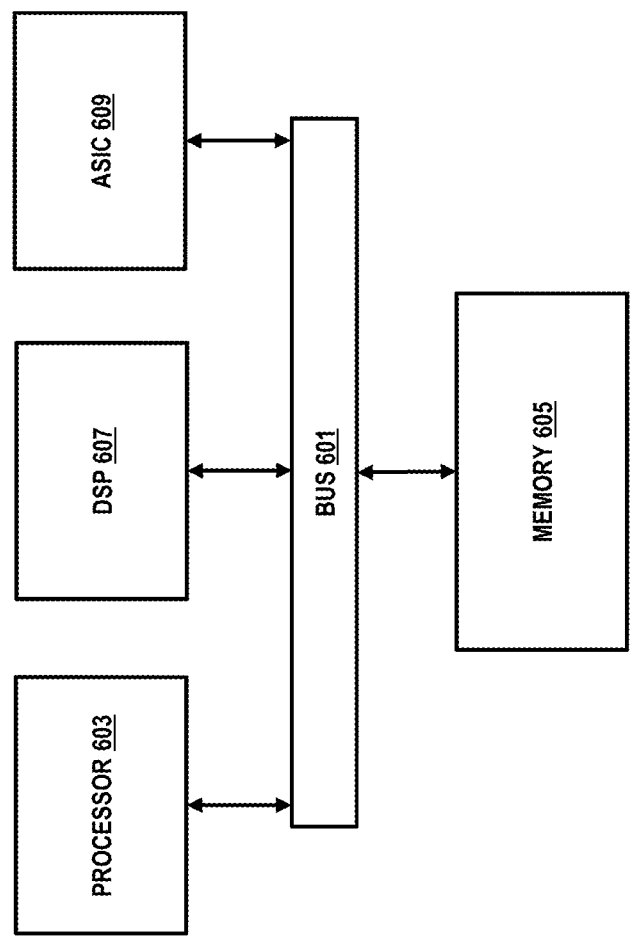
FIG. 6 is a diagram of a chip set that can be used to implement an embodiment of the invention.

FIGS. 3A-3D are flowcharts of a process for providing power utilization information for one or more operational states of an application across different operating systems, according to various embodiments. In one embodiment, the power utilization platform 103 performs processes 300, 308, 314 and 318 and is implemented in, for instance, a chip set including a processor and a memory as shown in FIG. 6.

In step 301 of process 300 (FIG. 3A), the power utilization platform 103 determines power utilization information for one or more operational states of an application, one or more operating systems in which the application executes, or a combination thereof. As noted, the operational states may correspond to the execution of specific functions or features of the application. Hence, the platform 103 may support the determining and managing of application power utilization for an application in its entirety or select features thereof. In another step 303, the platform 103 determines the power utilization information using a benchmark evaluation system. As mentioned, the benchmark evaluation system may include an automated power utilization test scenario, a custom power utilization test scenario, or a combination thereof. The test scenarios may be implemented as one or more scripts.

In another step 305, the platform 103 stores the power utilization information as metadata associated with a record of the application in a data repository associated with an application distribution service. Per this execution, the power utilization information is readily associated with the application or details thereof (e.g., cost information, product information, feature information). In step 307, the platform 103 presents the power utilization information in a user interface of the application distribution service in a response to a request to view the record of the application. It is noted that the power utilization information includes a minimum power utilization, an average power utilization, a maximum power utilization, or a combination thereof the one or more operational states, the one or more operating systems, or a combination thereof.

In step 309 of process 308 (FIG. 3B), the power utilization platform 103 determines one or more characteristics of a device making the request to view the record of the application. The viewing request is submitted by the device as it accesses the application distribution service, i.e., an application store or download center. In another step 311, the platform 103 adapts the power utilization information based on the one or more characteristics of the user device. As mentioned previously, the one or more characteristics may include a device type, a device capability, available power information, historical power utilization of the device, historical power-related behavior of the application, or a combination thereof. Per step 313, the platform 103 presents the adapted power utilization information in the user interface. This adaptation may occur dynamically, such that updates to the power utilization information is readily conveyed to the user of the device in response to the device behavior, the behavior of other devices that execute the same operating system, or a combination thereof.

In step 315 or process 314 (FIG. 3C), the power utilization platform 103 determines a prioritization of the application among a plurality of other applications installed on the device based on the power utilization information. In another step 317, the platform 103 manages an execution of the one or more operational states of the application, the plurality of other applications, or a combination thereof at the device based on the prioritization. By way of example, the platform 103 may activate, deactivate or limit the use of a refresh feature of an email application such that the application performs fewer scheduled updates. As another example, the platform 103 may manage the execution of a location finding application to perform less frequent polling by the location sensors for detecting location information.

In step 319 or process 318 (FIG. 3D), the power utilization platform 103 receives an input for specifying a desired operating time duration for the device. As noted, the operating time duration may correspond to a specific start time and end time. In another step 321, the platform receives an input for designating whether the applications, the plurality of other applications, or a combination thereof are respectively essential or non-essential. Per step 323, the platform 103 manages the execution of the one or more operational states of the application, the plurality of the other applications, or a combination thereof based on the prioritization to achieve the desired operating time duration. It is noted that the prioritization is further based, at least in part, on the essentiality designation.

FIGS. 4A-4E are diagrams of user interfaces utilized in the processes of FIGS. 3A-3D, according to various embodiments. For the purpose of illustration, the diagrams are described with respect to an exemplary use case of a user device accessing the power utilization platform to acquire useful power utilization information regarding different applications. In addition, the diagrams are described from the perspective of a user requiring the managing of one or more operational states of an application for a specified period of time.

Figure 4A:
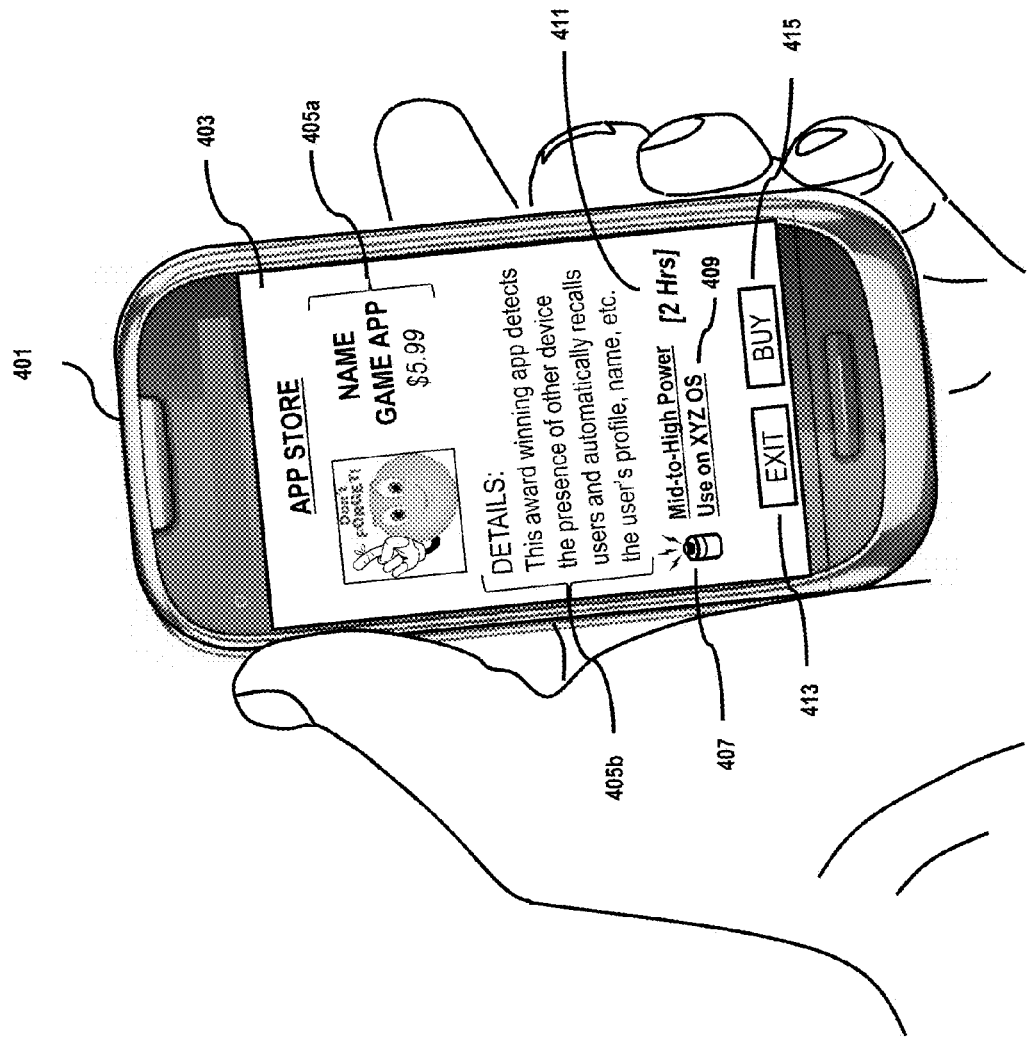
FIGS. 4A-4E are diagrams of user interfaces utilized in the processes of FIGS. 3A-3D, according to various embodiments.

In FIG. 4A, the user device 401 accesses the application store user interface 403 to view details regarding various applications available for download and/or purchase. The details may include the name of an application available for purchase (e.g., NAME GAME) along with cost information 405a. In addition a description of the application 405b is presented as well as one or more action buttons 413 and 415 for enabling the user to exit the interface or purchase the application respectively.

Of note, the application store interface 403 is accessed by way of a browser application of the user device 401, which is configured to communicate with the application store via the network and acquire content for presentment. Hence, per this scenario, the request to view the details of the application at the application store causes the power utilization platform 103 to determine the characteristics of the device that initiated the request. This includes, for example, initiating a feedback message to the device for receiving operating system details of the device, battery consumption/capacity information, device type information, processor type information, memory utilization information, etc. Based on the determined characteristics, the power utilization platform 103 causes power utilization information to be rendered specific to the operating system of the requesting user device 401.

In this case, the power utilization information is presented as an icon 407 for representing a level of consumption of the application for the specific operating system of the user device 401. In addition, the information is presented as a grade for indicating the application requires "Mid-to-High" power use for the specific operating system (XYZ OS) that runs on the device 401. This information may be based on benchmark data representative of other user devices that accessed the application for the same operating system as user device 401. It is noted that, as the benchmark and/or historical power utilization information changes for the user device 401 or other devices that employ the application via the same operating system, the grade information may be adapted at the display accordingly (e.g., change from "Low-to-Mid" based on a broader range of samples for determining the benchmark.

Still further, the power utilization information includes an amount of time 411 that the application could continuously run on the user device 401 assuming the battery of the user device was at full capacity. It is noted that the amount of time 411 of continuous execution may be determined based, at least in part, on the determined battery capacity of the user device as well as optionally on the current battery levels of the device 401 or installed/running applications. As noted above, the time of continuous execution may be adapted and presented anew to the interface 403 in response to updating of the benchmark information or the behavior of the user device (e.g., the closing of one or more network applications at the device). By way of example, reduced execution of one or more applications or operating states of applications at the device may result in the continuous time representation being changed to 4 hours instead of 2, due to minimized power utilization by the user device 401.

Based on this power utilization information, the user is able to better evaluate whether they want to acquire the application. This enables the user make a decision not just on the basis of the price or the details/features of the application; but rather on the basis of the standard, typical or specific amount of power utilization of the application for the XYZ operating system.

Figure 4B:
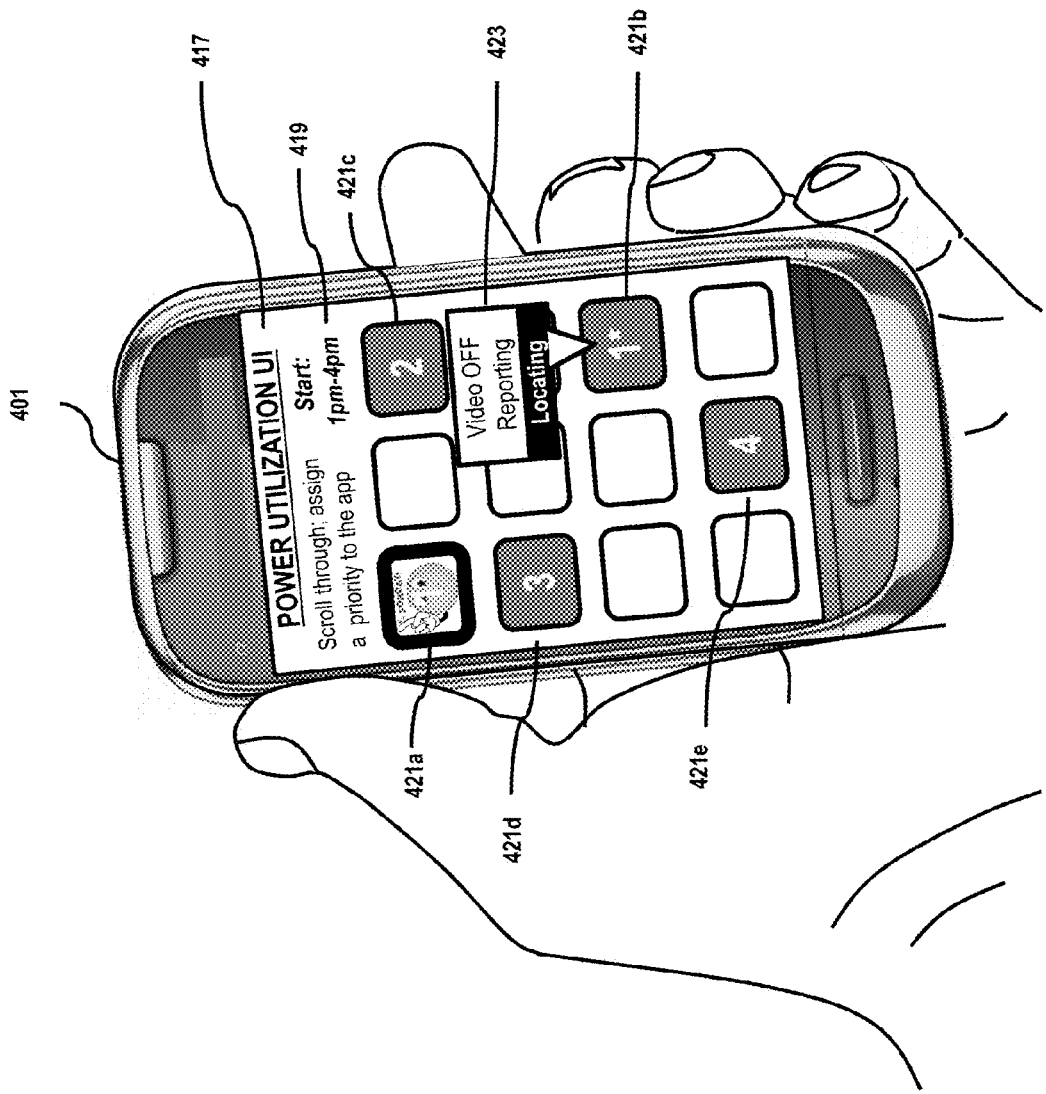

In FIG. 4B, the user device 401 accesses a user interface 417 of the power utilization platform 103 in order to specify one or more user preferences. In this example, the user wants to be able to utilize the NAME GAME application—as acquired per FIG. 4A—for use at a social networking event they will be attending from 1 PM to 4 PM. Hence, the user enters the time period at a time duration field 419 of the interface 417. In addition, the user may (optionally) assign a priority to various applications of the device, wherein the priority corresponds to an order/priority in which to discontinue the use of that application during the specified time period. Still further, the user may designate one or more applications as essential and/or non-essential via the interface 417.

Under this scenario, the user interface 417 presents a graphical list of the available applications of the user device 401. In addition, the user may select an application in its entirety or specific operations states/features of the application. For example, when the user selects and holds the icon 421*a* that represents the NAME GAME application, the icon becomes highlighted for indicating that this is an essential application. As another example, when the user taps the icons 421*b*-421*e*, which are representative applications the user wants to discontinue during the time period, these icons become masked. The user may also assign a priority to each of the masked applications, wherein the priority represents the order of execution of discontinuation of that application or the level of precedence of one application versus another. In the case of the applications represented by icons 421*c*-421*e*, the user indicates that these are to be discontinued in their entirety. As such, the applications are completely shut down/deactivated during the time period. However, in the case of the application represented by icon 421*b*, the user specifies that one specific operating state of that application be discontinued, which is the "Locating" feature of the application.

Once this input is provided by the user, it is then transmitted to the power utilization platform 103 via a network. Alternatively, in the case wherein the power utilization platform 103 is directly integrated within the user device 401 (as an application or service at the device); the platform 103 then initiates management of the application based on the input. In addition, the platform 103 determines power utilization information for the operating states of the applications specified, device characteristics for the user device 401 and any historical power utilization information for the user device 401 that initiated the request from the user interface 417.

While not presented herein, the power utilization platform 103 may cause the user interface 417 to be updated to reflect a recommended prioritization of the one or more applications. The recommendation may be based upon updated power utilization information as culled from other repositories regarding the same application, updated behavior of the user device submitting the request, or the like. In either case, the action may correspond to a recommendation that is approved by the user or be performed as an automated execution of the power utilization platform 103 for fulfilling the requirements of the user during the time period 419 for the specific operating system and available power levels of the user device 401.

Figure 4C:
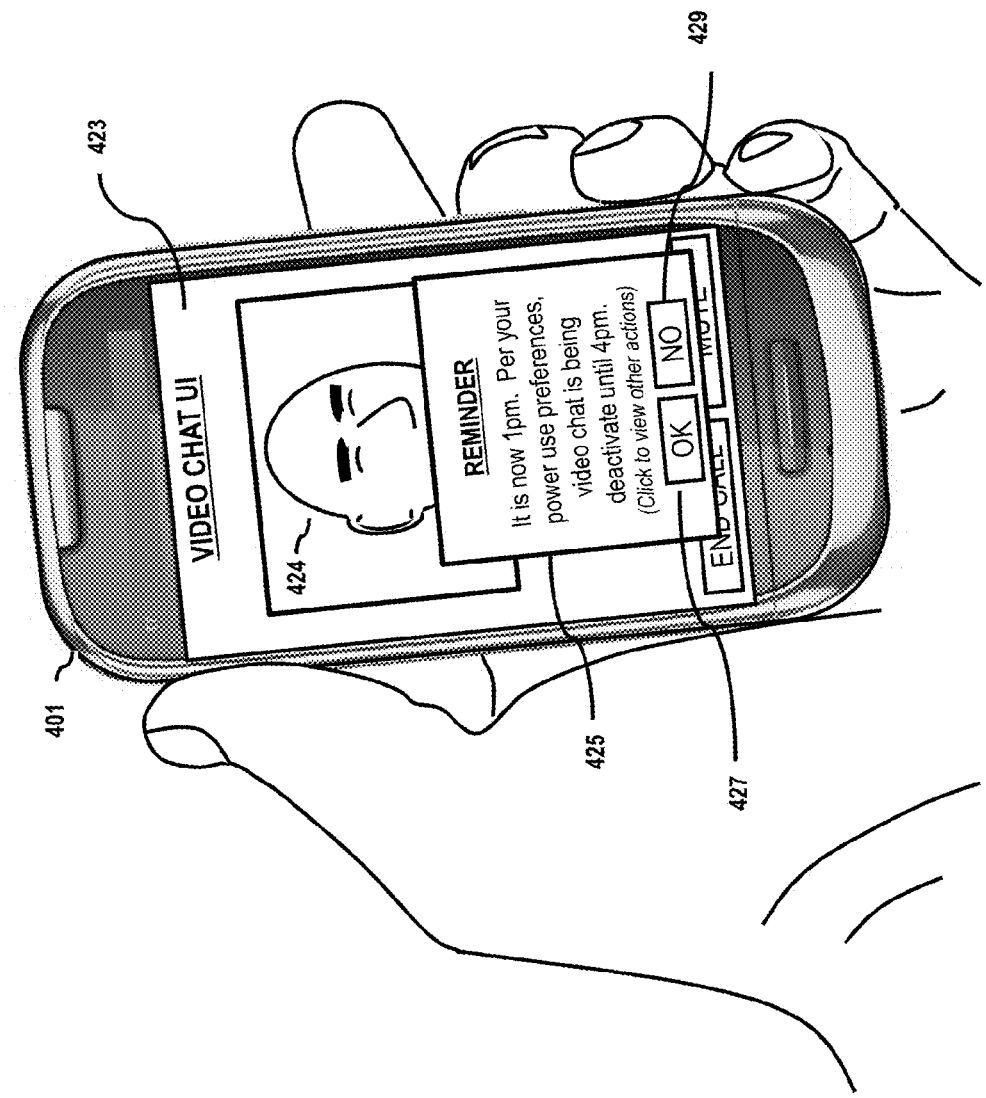

In FIG. 4C, the power utilization platform 103 initiates managed execution of one or more operational states of the applications of the user device 401. In keeping with the example, at the time of 1 PM, the platform 103 causes a reminder message 425 to be presented to a user interface 423 of a video chat application. The reminder message 425 is presented to the display in this case even while the user is engaged in a video chat session with a friend whose image is shown as 424. The message is meant to remind the user that the managed execution period is to be initiated as specified by the user. Even if a start time for the period is not entered by the user, the platform 103 may determine a start time for the managed execution period based on the user-specified desired availability for the essential application. The user may optionally select a link for viewing the full details of the managed executions and/or actions to be taken by the platform 103 (e.g., which application(s) and/or operational states of various applications will be discontinued). An OK or NO action button 427 and 429 respectively may be selected by the user for enabling the managed execution to commence or dispense. The reminder notification feature may also be disabled based on user preferences.

Figure 4D:
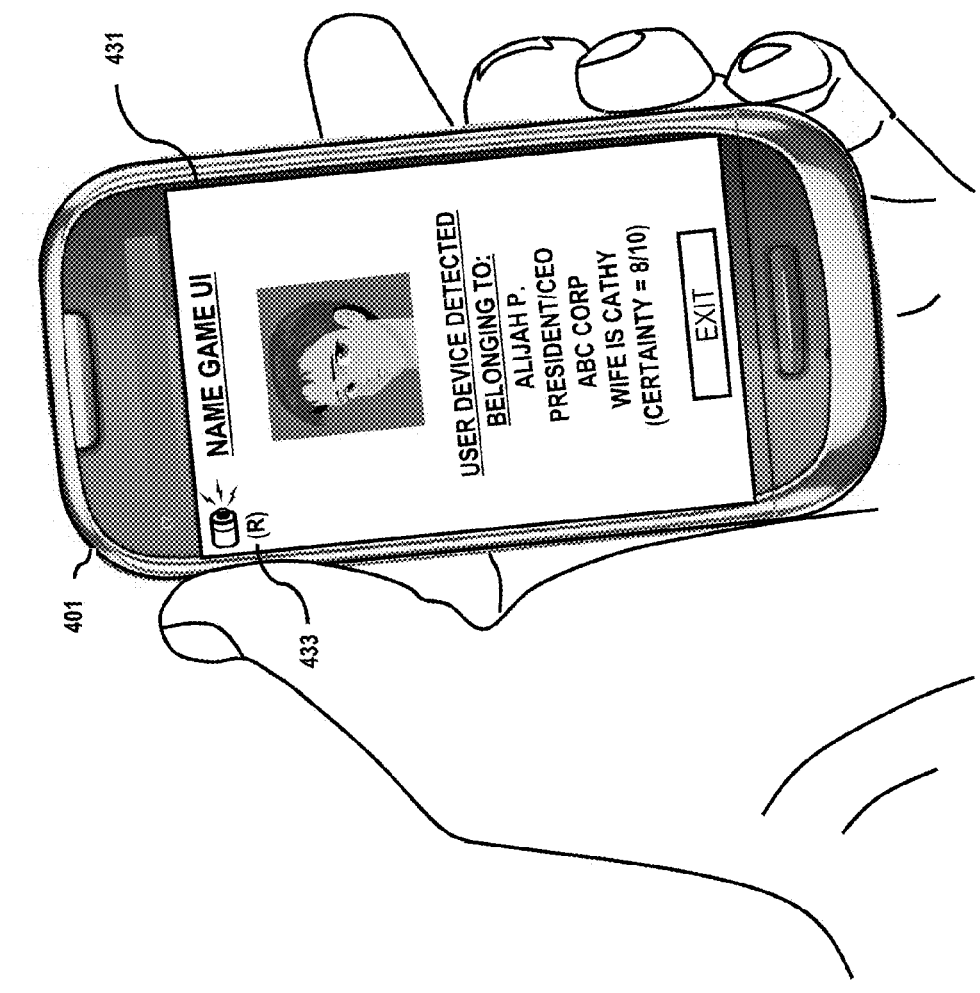
Figure 4E:

In FIG. 4D, one the managed execution is enabled, the non-essential applications are discontinued and the essential application is activated, which in this example corresponds to the NAME GAME application. Under this scenario, the user interface 431 of the application is presented along with various details corresponding to the functionality of the application. In addition, the power utilization platform 103 renders a power utilization icon and message 433 to the user interface 432 for indicating that the device 401 and/or application is operating in a managed power utilization and execution mode. The "(R)" as presented underneath the icon also indicates that the power utilization of the NAME GAME application is being monitored and recorded by the platform 103. This recording action will occur for the duration of the time period, and is then reported to the platform periodically or at the end of the specified period, as depicted in FIG. 4E.

The processes described herein for providing power utilization information for one or more operational states of an application across different operating systems may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
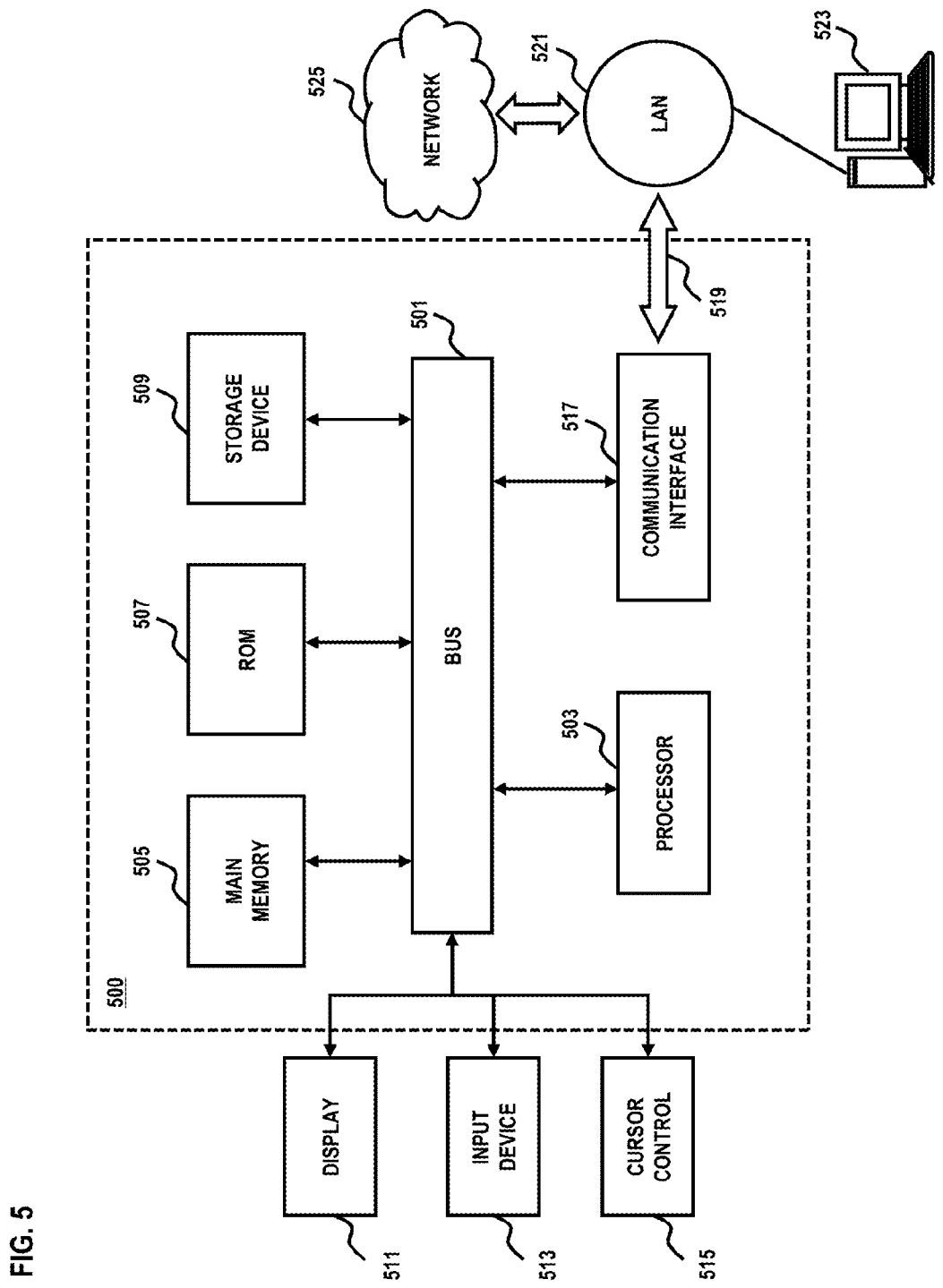
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4E, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to provide power utilization information for one or more operational states of an application across different operating systems as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing power utilization information for one or more operational states of an application across different operating systems.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide power utilization information for one or more operational states of an application across different operating systems. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining power utilization information for one or more operational states of an application and one or more operating systems in which the application executes;
   storing the power utilization information as metadata associated with a record of the application in a data repository associated with an application distribution service;
   receiving, from a device, a request to view the record of the application;
   determining one or more characteristics of the device;
   adapting the power utilization information based on the one or more characteristics of the device;
   presenting the adapted power utilization information in a user interface of the application distribution service;
   determining a prioritization of the application among a plurality of other applications installed on the device based on the power utilization information;
   receiving an input specifying a desired operating time duration for the device; and
   managing an execution of the one or more operational states of the application or the plurality of other applications at the device based on the prioritization to achieve the desired operating time duration.

2. A method of claim 1, further comprising:
   determining the power utilization information using a benchmark evaluation system,
   wherein the benchmark evaluation system includes an automated power utilization test scenario or a custom power utilization test scenario.

3. A method of claim 1, wherein the power utilization information includes a minimum power utilization, an average power utilization, or a maximum power utilization.

4. A method of claim 1, wherein the one or more characteristics include a device type, a device capability, available power information, historical power utilization of the device, or historical power-related behavior of the application.

5. A method of claim 1, further comprising:
   receiving an input for designating whether the application or the plurality of other applications are respectively essential or non-essential,
   wherein the prioritization is further based, at least in part, on the designation.

6. The method of claim 1, wherein the device is a smart phone.

7. A non-transitory computer-readable medium containing instructions, the instructions comprising:

one or more instructions that, when executed by one or more processors, cause the one or more processors to:

determine power utilization information for one or more operational states of an application and one or more operating systems in which the application executes;

store the power utilization information as metadata associated with a record of the application in a data repository associated with an application distribution service;

receive, from a device, a request to view the record of the application;

determine one or more characteristics of the device;

adapt the power utilization information based on the one or more characteristics of the device;

present the adapted power utilization information in a user interface of the application distribution service;

determine a prioritization of the application among a plurality of other applications installed on the device based on the power utilization information;

receive an input for specifying a desired operating time duration for the device; and manage an execution of the one or more operational states of the application or the plurality of the other applications based on the prioritization to achieve the desired operating time duration.

8. The non-transitory computer-readable medium of claim 7, wherein the one or more instructions further cause the one or more processors to:

determine the power utilization information using a benchmark evaluation system, wherein the benchmark evaluation system includes an automated power utilization test scenario or a custom power utilization test scenario.

9. The non-transitory computer-readable medium of claim 7, wherein the power utilization information includes a minimum power utilization, an average power utilization, or a maximum power utilization.

10. The non-transitory computer-readable medium of claim 7, wherein the one or more characteristics include a device type, a device capability, available power information, historical power utilization of the device, or historical power-related behavior of the application.

11. The non-transitory computer-readable medium of claim 7, wherein the one or more instructions further cause the one or more processors to:

receive an input for designating whether the application or the plurality of other applications are respectively essential or non-essential, wherein the prioritization is further based, at least in part, on the designation.

12. The non-transitory computer-readable medium of claim 7, wherein the device is a smart phone.

13. A system comprising:

a processor; and a memory, coupled to the processor, storing instructions that, when executed by the processor, cause the processor to:

determine power utilization information for one or more operational states of an application and one or more operating systems in which the application executes;

store the power utilization information as metadata associated with a record of the application in a data repository associated with an application distribution service;

receive, from a device, a request to view the record of the application;

determine one or more characteristics of the device;

adapt the power utilization information based on the one or more characteristics of the device;

present the adapted power utilization information in a user interface of the application distribution service;

determine a prioritization of the application among a plurality of other applications installed on the device based on the power utilization information;

receive an input for specifying a desired operating time duration for the device; and manage an execution of the one or more operational states of the application or the plurality of the other applications based on the prioritization to achieve the desired operating time duration.

14. A system of claim 13, wherein the instructions further cause the processor to determine the power utilization information using a benchmark evaluation system, wherein the benchmark evaluation system includes an automated power utilization test scenario or a custom power utilization test scenario.

15. A system of claim 13, wherein the power utilization information includes a minimum power utilization, an average power utilization or a maximum power utilization.

16. The system of claim 13, wherein the device is a smart phone.

* * * * *